US012789658B2

(12) United States Patent
Song et al.

(10) Patent No.: US 12,789,658 B2
(45) Date of Patent: Nov. 10, 2026

(54) WIRELESS CHARGING HEATING SYSTEM, WIRELESS CHARGING SYSTEM, WIRELESS CHARGING HEATING METHOD AND WIRELESS CHARGING METHOD

(71) Applicant: Dalian University of Technology, Dalian City (CN)

(72) Inventors: Yongchen Song, Dalian City (CN); Heng Huang, Dalian City (CN); Yubai Li, Dalian City (CN); Minli Bai, Dalian City (CN); Chengzhi Hu, Dalian City (CN); Yang Li, Dalian City (CN); Linsong Gao, Dalian City (CN)

(73) Assignee: Dalian University of Technology, Dalian City (CN)

( * ) Notice: Subject to any disclaimer, the term of this patent is extended or adjusted under 35 U.S.C. 154(b) by 643 days.

(21) Appl. No.: 18/241,327

(22) Filed: Sep. 1, 2023

(65) Prior Publication Data

US 2024/0375536 A1 Nov. 14, 2024

(30) Foreign Application Priority Data

May 10, 2023 (CN) ......................... 202310526181.0

(51) Int. Cl.

| | |
|---|---|
| ***B60L 53/30*** | (2019.01) |
| ***B60L 53/122*** | (2019.01) |
| ***B60L 53/36*** | (2019.01) |
| ***B60L 53/39*** | (2019.01) |
| ***B60L 53/62*** | (2019.01) |

(52) U.S. Cl.

CPC ............. *B60L 53/39* (2019.02); *B60L 53/122* (2019.02); *B60L 53/36* (2019.02); *B60L 53/62* (2019.02); *B60L 2240/545* (2013.01)

(58) Field of Classification Search

CPC .......... B60L 53/39; B60L 53/62; B60L 53/36; B60L 53/122

USPC .......................................................... 320/109

See application file for complete search history.

(56) References Cited

U.S. PATENT DOCUMENTS

| | | | | |
|---|---|---|---|---|
| 2024/0291320 | A1* | 8/2024 | Schuler | H02J 7/92 |
| 2025/0201800 | A1* | 6/2025 | Kuriki | H01M 4/622 |
| 2025/0226451 | A1* | 7/2025 | Higo | H01M 10/0525 |

* cited by examiner

*Primary Examiner* — Ahshik Kim

(74) *Attorney, Agent, or Firm* — Lerner David LLP

(57) ABSTRACT

A wireless charging heating system, a wireless charging system, a wireless charging heating method and a wireless charging method are provided. The wireless charging heating system includes a lithium-ion battery stack; a battery stack power frequency converter connected with the lithium-ion battery stack and configured to convert direct current output from the lithium-ion battery stack into high-frequency alternating current; a heating system switch connected with the battery stack power frequency converter and configured to control on or off of the high-frequency alternating current; a heating coil connected with the heating system switch and configured to heat the lithium-ion battery stack; and a single chip microcomputer connected with the lithium-ion battery stack, the battery stack power frequency converter and the heating system switch and configured to monitor temperature of the lithium-ion battery stack and control an operating state of the battery stack power frequency converter and the heating system switch.

11 Claims, 2 Drawing Sheets

WIRELESS CHARGING HEATING SYSTEM, WIRELESS CHARGING SYSTEM, WIRELESS CHARGING HEATING METHOD AND WIRELESS CHARGING METHOD

CROSS-REFERENCE TO RELATED APPLICATION

This patent application claims the benefit and priority of Chinese Patent Application No. 2023105261810 filed with the China National Intellectual Property Administration on May 10, 2023, the disclosure of which is incorporated by reference herein in its entirety as part of the present application.

TECHNICAL FIELD

The present disclosure relates to the technical field of wireless charging of electric vehicles, in particular to a wireless charging heating system, a wireless charging system, a wireless charging heating method and a wireless charging method.

BACKGROUND

With the development of electric vehicles, more and more attention has been paid to cruising range and service life decay of lithium-ion batteries in electric vehicles at low temperatures in winter. When the temperature drops below zero degrees Celsius, the battery capacity and output power decrease sharply due to the decrease of internal electrolyte performance and electrode electrochemical reaction rate. In addition, if the battery is forcibly charged in this case, lithium ions will be deposited on an interface between a negative electrode and a solid electrolyte in a solid phase, and the life decay of the battery is accelerated. If the deposited lithium develops continuously in a dendritic form, a hidden danger of short circuit inside the battery may occur, resulting in the danger of fire or explosion of the battery. Therefore, designing a cold start preheating method and a charging method which can be started conveniently and quickly at low temperature is the key to improve the cruising range and market share of electric vehicles.

At present, the low-temperature heating methods of lithium-ion electric vehicles mainly adopt an electric heating method, a heat pump air conditioning preheating method and a hot fluid heating method. For example, a heating film with positive temperature coefficients attached to a side of a battery is designed by Xing Cheng et al. in the patent “Battery Heating Film and Battery Module” (Patent No. 202222713253.6). The resistance of the heating film increases with the increase of temperature. When the temperature reaches a certain value, the resistance of the heating film also increases to a corresponding value, which causes the current in the heating film to be too small to heat, thereby automatically keeping the temperature of the battery. The design adopts the heating film with a resistance value positively related to the temperature, to realize a battery pack low-temperature heating method for automatic temperature control, and has a simple structure and low cost. However, in a rapid heating application scenario, an external heating method cannot avoid the disadvantage of large heat flux on a contact boundary with the battery, resulting in uneven temperature distribution of a single battery in the radial direction, which limits the application scenario.

For example, a power battery liquid thermal management system integrated with low-temperature heating and high-temperature cooling is designed by Xu Changcheng et al. in the patent “Power Battery Liquid Heating and Cooling System” (Patent No. 201810924280.3). Different solenoid valves guide fluid in a liquid cooling plate to form different circulation circuits with cold ends and hot ends of semiconductor chilling plates. When the temperature is low, an electronic valve controls coolant circulation so that the hot ends of the chilling plates operate to heat the coolant. When the temperature is high, the cold ends operate through circulation, and the electronic valve controls the coolant to circulate in a cooling circuit to reduce the temperature of the battery. According to the method a set of system is integrated with an all-season thermal management efficiency, which greatly improves the energy density of electric vehicles. However, in view of the general low-power specifications of thermoelectric cooling fins in the market, the thermal management scheme may require a high cost to manufacture a high-power thermoelectric cooling fin device with the same heat exchange effect as a heat exchanger, and require a sealing process.

For example, a method of heating a compartment and a battery pack of an electric vehicle by using a fuel heater is proposed by He Jinkang in the patent “Battery Preheating and In-vehicle Heater of Electric Vehicle” (Patent No. 202220708280.1). A three-way valve controls the operation of the fuel heater by detecting the temperature of a power battery and the compartment through a temperature sensor, and other ends of the three-way valve are respectively connected with a warm air pipeline and a cooling circuit to heat the compartment and the battery pack. In the method, the fuel heater, as an external heat source, is used to realize compartment heating to reduce the heating load of the power battery and extend the cruising range of the electric vehicle. In the method, compound energy is used to heat the compartment, and the introduction of the fuel heater can reduce the energy density of the electric vehicle and increase the complexity of the device. The exhaust gas temperature of the heater may be dangerous to the fuel oil in the fuel tank, so it is necessary to consider the heat transfer method of the heater in detail.

There are still some improvements in the existing low-temperature thermal management mode of electric vehicle batteries. For example, because the safety of a high-power heating film heating battery is difficult to control, the battery pack is generally preheated by a heating method of high-voltage PTC (Positive Temperature Coefficient) heating cold air or a liquid storage tank, thus greatly reducing the heating efficiency. In addition, although the heating uniformity and high-temperature cooling efficiency of liquid preheating at low temperature are significantly improved, the overall energy density of the electric vehicle is greatly reduced due to the complex equipment, and the maintenance and investigation of fluid pipelines need to be optimized. At present, a method of preheating the battery pack with heat pump warm air is widely used, so that the heating efficiency is multiplied compared with the traditional warm air heating method, but the uniformity and heating speed of the battery pack are still keys to be improved at present. In addition to cold start heating of the electric vehicle, compared with a very convenient and fast operation to add fuel to the traditional fuel vehicles in winter, the electric vehicle needs to be charged by 80% in less than 10 minutes in cold and low temperature to show the due competitiveness. However, a difficulty lies in that high-rate charging at low temperature may lead to irreversible rapid capacity decay of batteries and even the danger of internal short circuit. Therefore, using a fast, uniform and efficient heating method to preheat the battery of the electric vehicle to a higher temperature for rapid charging, is also an application scenario that is difficult to achieve by traditional heating methods.

At present, a charging pile, a charging gun and a power charging station to replace a battery pack are widely used as energy supplementing methods of the electric vehicle in the market, but a more convenient wireless charging method for an electric vehicle is proposed. For example, Xiao Chunyan et al. proposed that a wireless charging mechanism and a vehicle-mounted battery can interact with each other by communication connection in terms of charging configuration parameters and match the charging configuration parameters in the patent "Wireless Charging Control Method and System for Electric Vehicle Based on Communication Protocol". The electric vehicle can be wirelessly charged when the matching result indicates that the charging mechanism meets the charging requirements of the electric vehicle. This charging method has a wide range of charging area, can realize mobile charging, and solves the problem of queuing for charging in dense areas. However, a matching mechanism based on the communication protocol only detects the state-of-charge and allowed charging parameters of the battery, and does not consider the influence of a charging method of the battery at different temperatures, especially low temperature, on the service life of the battery.

Therefore, based on a wireless charging method, a heating coil and a heating control element are coupled in a vehicle-mounted wireless charging coil to improve the problem that the service life of the battery is fast decayed at low temperature by the wireless charging method.

SUMMARY

The objective of embodiments of the present disclosure is to provide a wireless charging heating system, a wireless charging system, a wireless charging heating method and a wireless charging method, which improve the deficiency of a wireless charging mode in winter by coupling a heating coil and a heating control element in a vehicle-mounted wireless charging coil.

In order to achieve the above objective, the present disclosure provides the following technical solution.

In a first aspect, the present disclosure provides a wireless charging heating system, including:

- a lithium-ion battery stack;
- a battery stack power frequency converter connected with the lithium-ion battery stack and configured to convert direct current output from the lithium-ion battery stack into high-frequency alternating current;
- a heating system switch connected with the battery stack power frequency converter and configured to control on or off of the high-frequency alternating current;
- a heating coil connected with the heating system switch and configured to heat the lithium-ion battery stack; and
- a single chip microcomputer connected with the lithium-ion battery stack, the battery stack power frequency converter and the heating system switch, and configured to monitor a temperature of the lithium-ion battery stack and control an operating state of the battery stack power frequency converter and the heating system switch.

In the second aspect, the present disclosure provides a wireless charging system, including the wireless charging heating system, a transmitting part, and a receiving part.

The transmitting part includes:

- a power frequency power supply;
- a main circuit switch connected with the power frequency power supply;
- a frequency converter connected with the main circuit switch; and
- a transmitting coil connected with the frequency converter.

The receiving part includes:

- a receiving coil;
- a rectifier connected with the receiving coil;
- a voltage stabilizer connected with the rectifier; and
- a charging controller connected with the lithium-ion battery stack and configured to monitor a state-of-charge of the lithium ion battery stack.

Optionally, the wireless charging system further includes a mechanical auxiliary system.

The mechanical auxiliary system includes:

- a lifting platform connected with the single chip microcomputer, and provided with the transmitting coil; and
- a sensing device connected with the single chip microcomputer and configured to detect a distance between the lifting platform and an automobile chassis and send a detection result to the single chip microcomputer.

Optionally, the transmitting coil is a plane disc with ten turns of wound copper wires.

Optionally, the sensing device is a distance sensor.

In the third aspect, the present disclosure also provides a wireless charging heating method. The heating method is applied to the wireless charging heating system. The heating method includes:

- controlling the heating system switch to be closed;
- controlling the battery stack power frequency converter to be closed; and
- enabling high-frequency alternating current to enter the heating coil through wires, and inducing eddy current around the lithium ion battery stack to heat the lithium-ion battery stack.

In the fourth aspect, the present disclosure provides a wireless charging heating method. The heating method is applied to the wireless charging heating system. The heating method includes:

- controlling the main circuit switch to be closed;
- controlling the frequency converter to rectify, filter and modulate the power frequency power supply to high-frequency alternating current, and generating a high-frequency magnetic field in the transmitting coil by the high-frequency alternating current;
- inducing low-amplitude alternating current with a same frequency in the receiving coil by the high-frequency magnetic field generated in the transmitting coil;
- converting the low-amplitude alternating current with the same frequency into direct-current voltage through the rectifier and enabling the direct-current voltage to enter the voltage stabilizer to obtain direct current, and charging the lithium-ion battery stack; and
- monitoring a state-of-charge of the lithium ion battery stack in real time and controlling end of charging.

Optionally, before controlling the main circuit switch to be closed, the method further includes:

- controlling the lifting platform to rise;
- monitoring the distance between the lifting platform and the automobile chassis;
- after the predetermined distance is reached, controlling the lifting platform to stop; and
- after charging is finished, controlling the lifting platform to descend.

According to the specific embodiments provided by the present disclosure, the present disclosure has the following technical effects.

In the present disclosure, an eddy-current heating system is coupled in a wireless charging circuit, and the same high-frequency alternating current is shared with a vehicle-mounted wireless induction charging receiving circuit, so that the comprehensive utilization of energy and the simplification of the heating system are realized. For an outdoor cold start application scenario, an eddy-current heating method in which the energy of a vehicle-mounted battery is used as energy is designed. The energy of the battery is used to heat the battery, so that the cruising range of the electric vehicle is improved. Eddy current heating uses eddy-current loss induced at the housing of the battery by the alternating current in the heating coil to release huge heat to heat the battery. The efficiency is as high as 95% and the heating rate is high, which is suitable for the battery thermal management strategy of fast cold start and fast charging in winter. In the charging system and the heating system, the state-of-charge and temperature of the battery are monitored in real time by the single chip microcomputer, and the operating states of the heating system and the charging system are controlled to achieve the purpose of self-stopping, thus ensuring the safety of the system. The mechanical auxiliary equipment of the lifting platform is used to improve the charging efficiency of wireless charging of the electric vehicle. Compared with the traditional energy supplementing methods of charging guns and power changing stations, a wireless induction charging method based on an electromagnetic induction principle is convenient to operate and can realize one-to-many charging scenarios for large traffic volume.

BRIEF DESCRIPTION OF THE DRAWINGS

To describe the technical solutions in the embodiments of the present disclosure or in the prior art more clearly, the accompanying drawings required in the embodiments are briefly described. Apparently, the accompanying drawings in the following description show merely some embodiments of the present disclosure, and other drawings can be derived from these accompanying drawings by those of ordinary skill in the art without creative efforts.

DESCRIPTION OF REFERENCE SIGNS

1, receiving coil; 2, rectifier; 3, voltage stabilizer; 4, charging controller; 5, lithium-ion battery stack; 6, heating coil; 7, single chip microcomputer; 8, heating system switch; 9, power frequency power supply; 10, frequency converter; 11, transmitting coil; 12, main circuit switch; 13, lifting platform; 14, distance sensor; and 15, battery stack frequency converter.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

Embodiments of the present disclosure is to provide a wireless charging heating system, a wireless charging system, a wireless charging heating method and a wireless charging method, which improve deficiency of a wireless charging mode in winter by coupling a heating coil and a heating control element in a vehicle-mounted wireless charging coil.

To make the foregoing objective, features and advantages of the present disclosure clearer and more comprehensible, the present disclosure is further described in detail below with reference to the accompanying drawings and specific embodiments.

Embodiment I

Figure 1:
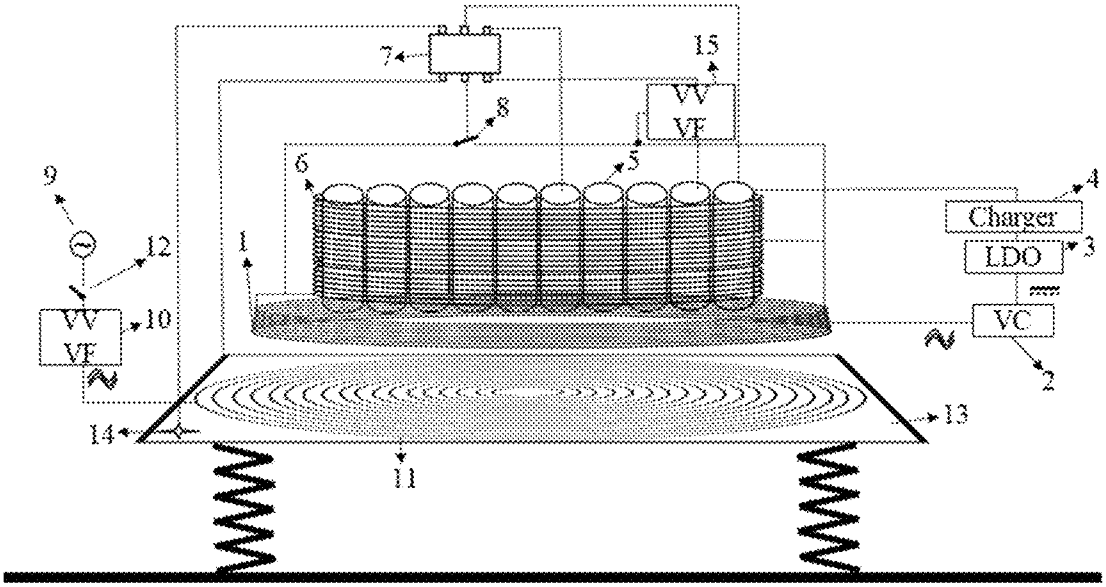
FIG. 1 is a schematic diagram of a wireless charging system in the present disclosure.

The present disclosure provides a wireless charging heating system, as shown in FIG. 1, specifically including:

a lithium-ion battery stack 6, a battery stack power frequency converter 15, a heating system switch 8, a heating coil 6 and a single chip microcomputer 7.

The battery stack power frequency converter 15 is connected with the lithium-ion battery stack 6 and configured for converting direct current output from the lithium-ion battery stack 6 into high-frequency alternating current.

The heating system switch 8 is connected with the battery stack power frequency converter 15 and configured for controlling on or off of the high-frequency alternating current, namely controlling whether the alternating current flows into the heating coil 6 wound around the lithium-ion battery stack is controlled.

The heating coil 6 is connected with the heating system switch 8 and configured for heating the lithium-ion battery stack 6.

The single chip microcomputer 7 is connected with the lithium-ion battery stack 5, the battery stack power frequency converter 15 and the heating system switch 8, and configured for monitoring the temperature of the lithium-ion battery stack 5 and controlling the operating states of the battery stack power frequency converter 15 and the heating system switch 8.

The above is a heating circuit when vehicle-mounted battery energy is used for cold start. In addition, the heating system is also coupled in a wireless charging main circuit. When a main circuit switch 12 is closed, the single chip microcomputer 7 controls the heating system switch 8 to be closed and the battery stack power frequency converter 15 to be closed. Then, the high-frequency alternating current in a receiving coil 1 enters the heating coil 6 through wires and then enters a charging circuit of a receiving part. When the high-frequency current passes through the heating coil 6, eddy current can be induced on a housing of the lithium-ion battery stack 5 to quickly heat the battery.

Embodiment II

Based on a wireless charging heating system in the first embodiment, the present disclosure also provides a wireless charging system, specifically including a wireless charging heating system in the first embodiment, a transmitting part and a receiving part.

The transmitting part includes:

a power frequency power supply 9;

a main circuit switch 12 connected with the power frequency power supply;

a frequency converter 10 connected with the main circuit switch; and a transmitting coil 11 connected with the frequency converter.

The receiving part includes:

a receiving coil 1;

a rectifier 2 connected with the receiving coil;

a voltage stabilizer 3 connected with the rectifier; and a charging controller 4 connected with the lithium-ion battery stack 5 and configured to monitor a state-of-charge of the lithium-ion battery stack 5.

When the main circuit switch 12 is closed by external operation, the power frequency power supply 10 is rectified, filtered and modulated by the power frequency power supply 9 to high-frequency alternating current, low-amplitude alternating current with a same frequency is induced in a wireless charging receiving circuit by a high-frequency magnetic field generated in the transmitting coil 11.

The low-amplitude alternating current with the same frequency is induced in the receiving coil 1 mounted on a chassis of an electric vehicle by the high-frequency magnetic field generated in the transmitting coil 11. The receiving coil 1 is connected with the vehicle-mounted rectifier 2. The alternating current is converted into direct-current voltage through the rectifier 2, and the direct-current voltage enters the voltage stabilizer 3 to be converted into direct current which can charge the lithium-ion battery stack 5. The charging circuit monitors a state-of-charge of the lithium-ion battery stack 5 in real time and controls end of charging by the charging controller 4 of a charging main circuit of the receiving part.

Further, the wireless charging system in the present disclosure also includes a mechanical auxiliary system.

The mechanical auxiliary system specifically includes:

a lifting platform 13 connected with the single chip microcomputer 7, provided with the transmitting coil; and configured as a moving mechanical equipment or fixedly mounted at a parking point or a charging position;

a sensing device connected with the single chip microcomputer and configured to detect the distance between the lifting platform 13 and an automobile chassis and send a detection result to the single chip microcomputer 7.

Specifically, the sensing device may be a distance sensor 14 or other distance measuring devices.

When the lifting platform 13 operates, the distance sensor 14 mounted on the lifting platform 13 monitors the distance between the lifting platform 13 and the chassis of the electric vehicle and transmits a signal to the single chip microcomputer 7. When the distance value is less than a predetermined value, the single chip microcomputer 7 controls the lifting platform 13 to stop operating to maximize the charging efficiency. When the single chip microcomputer 7 receives a signal that the charging of the lithium-ion battery stack 5 is finished, the lifting platform 13 is controlled to descend until a distance signal fed back by the distance sensor 14 reaches the predetermined value.

Embodiment III

The present disclosure also provides a wireless charging heating method. The heating method is applied to a wireless charging heating system in the first embodiment. The heating method includes:

controlling the heating system switch to be closed;

controlling the battery stack power frequency converter to be closed; and enabling high-frequency alternating current to enter the heating coil through wires, and inducing eddy current around the lithium-ion battery stack to heat the lithium-ion battery stack.

Embodiment IV

The present disclosure also provides a wireless charging method. The charging method is applied to a wireless charging system in the second embodiment. The charging method includes three application scenarios. The first scenario is in a normal-temperature environment, the second scenario is in a low-temperature environment, and the third scenario is a cold start scenario of an electric vehicle in a low-temperature environment.

When the wireless charging method is applied to an electric vehicle charging scenario in the normal temperature environment, the electric vehicle keeps static, and the method specifically includes the following steps.

Figure 2:
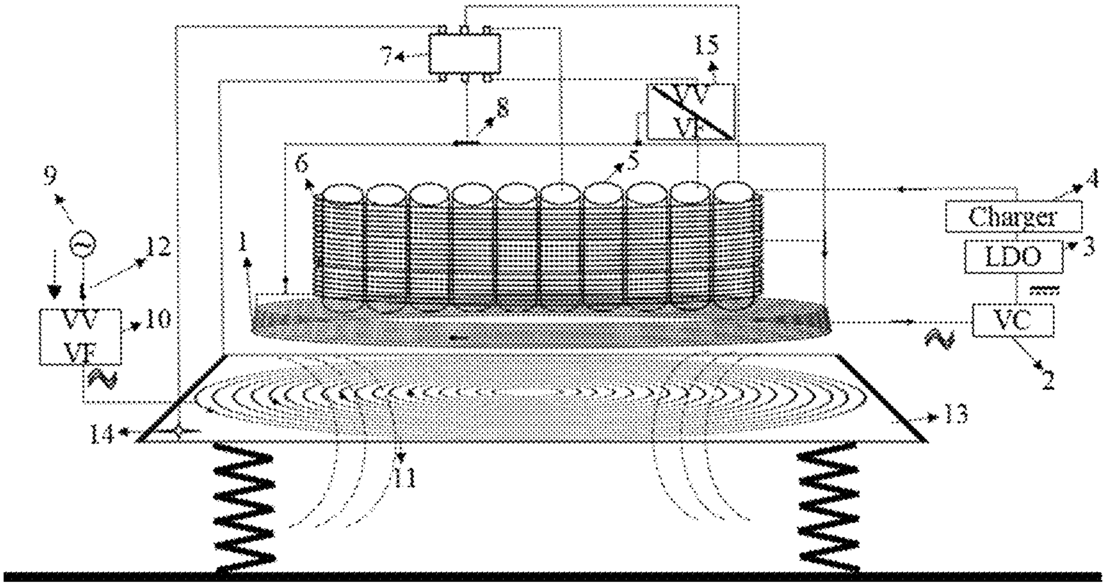
FIG. 2 is a schematic diagram of a wireless charging system when a wireless charging method in the present disclosure is applied to a charging scene of an electric vehicle in a normal-temperature environment.

The single chip microcomputer 7 controls the lifting platform 13 to rise to vicinity of a chassis of the electric vehicle according to a distance signal fed back by a distance sensor 14, and a main circuit switch 12 is closed. The single chip microcomputer 7 controls a heating system switch 8 to be closed and a lithium ion battery stack frequency converter 15 to be opened according to the temperature of the lithium-ion battery stack 5. Alternating current of a power frequency power supply 9 is converted into high-frequency alternating current through a frequency converter 10, so that a high-frequency magnetic field is generated in a transmitting coil 12, and the high-frequency alternating current with a same frequency and lower amplitude is induced in a receiving coil 1 according to an electromagnetic induction principle. In a receiving circuit, the alternating current is converted into direct-current voltage through a rectifier 2 and a voltage stabilizer 3 for charging the lithium-ion battery stack 5. A charging controller 4 can control the operating state of a charging receiving circuit according to the state-of-charge of the lithium-ion battery stack 5, as shown in FIG. 2. After charging is finished, a main circuit switch 12 is opened, and the single chip microcomputer 7 controls the lifting platform 14 to descend.

When the wireless charging method is applied to an electric vehicle charging application scenario in the low-temperature environment, the method specifically includes the following steps.

Figure 3:
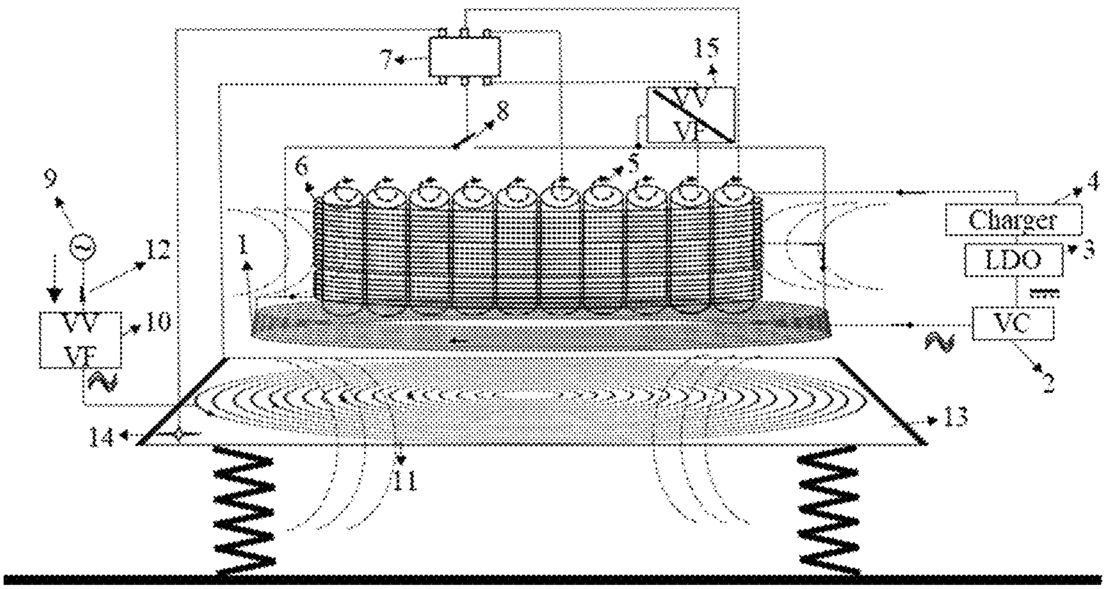
FIG. 3 is a schematic diagram of a wireless charging system when a wireless charging method in the present disclosure is applied to a charging scene of an electric vehicle in a low temperature environment.

Before the above charging at normal temperature, the single chip microcomputer 7 monitors that the temperature of the lithium-ion battery stack 5 is too low and starts a vehicle-mounted eddy-current heating system. At this time, the main circuit switch 12 is closed, the single chip microcomputer controls the heating system switch 8 to be opened and the lithium ion battery stack frequency converter 16 to be opened. A high-frequency magnetic field can be induced in a heating coil 6 by the high-frequency alternating current induced by wireless induction charging in the receiving circuit. Eddy current is induced on an external steel shell of the lithium-ion battery stack 5 according to an electromagnetic induction principle, so as to achieve the purpose of rapidly heating the battery. When the single chip microcomputer 7 monitors that the temperature of the lithium-ion battery stack 5 exceeds a certain value, the single chip microcomputer 7 opens the heating system switch 8 immediately so that the heating coil 6 is in a short-circuit state and starts charging, as shown in FIG. 3.

Figure 4:
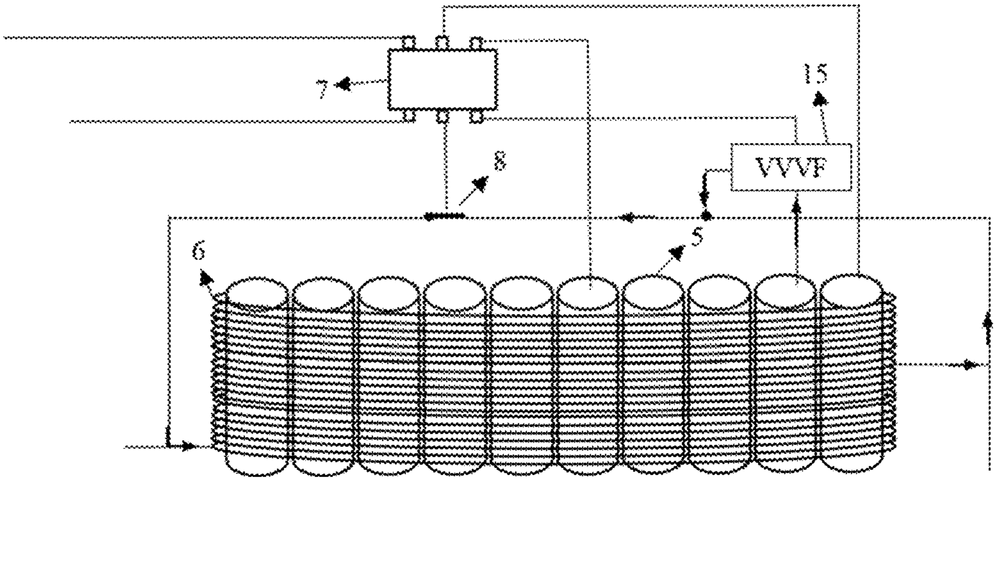
FIG. 4 is a schematic diagram of a wireless charging system when a wireless charging method in the present disclosure is applied to a cold start application scene of an electric vehicle in a low temperature environment.

When the wireless charging method is applied to a cold start scenario of an electric vehicle in a low-temperature environment, the energy of a vehicle-mounted battery pack is used to heat itself to improve the cruising range. Before starting, when the single chip microcomputer 7 monitors that the temperature of battery of the lithium-ion battery stack 5 is too low, the single chip microcomputer 7 controls the heating system switch 8 to be closed and the lithium-ion battery stack frequency converter 15 to operate, so that a receiving circuit part of a wireless charging part is in a short-circuit state at this time. The direct current of the vehicle-mounted battery is converted into high-frequency alternating current through the lithium-ion battery stack frequency converter 15 to generate a high-frequency magnetic field in the heating coil 6, so that the lithium-ion battery stack 5 is heated in an eddy-current heating mode. When the single chip microcomputer 7 detects that the temperature of the lithium-ion battery stack 5 exceeds a certain value, the single chip microcomputer 7 controls the lithium-ion battery stack frequency converter 16 to be opened, so that the electric vehicle stops preheating before cold start, as shown in FIG. 4. In order to see the function of the embodiment more intuitively, other non-operating components are omitted.

Embodiments of the present specification are described in a progressive manner. Each embodiment focuses on the difference from other embodiments, and the same and similar parts between the embodiments may refer to each other.

In this specification, some specific embodiments are used for illustration of the principles and implementations of the present disclosure. The description of the foregoing embodiments is used to help illustrate the method and the core ideas of the present disclosure. In addition, those skilled in the art can make various modifications in terms of specific implementations and the scope of application in accordance with the ideas of the present disclosure. In summary, the content of this specification should not be constructed as limitations to the present disclosure.

What is claimed is:

1. A wireless charging and heating system, comprising:
- a lithium-ion battery stack;
- a battery stack power frequency converter connected with the lithium-ion battery stack and configured to convert direct current output from the lithium-ion battery stack into high-frequency alternating current;
- a heating system switch connected with the battery stack power frequency converter and configured to control on or off of the high-frequency alternating current;
- a heating coil connected with the heating system switch and configured to heat the lithium-ion battery stack; and
- a single chip microcomputer connected with the lithium-ion battery stack, the battery stack power frequency converter and the heating system switch, and configured to monitor a temperature of the lithium-ion battery stack and control an operating state of the battery stack power frequency converter and the heating system switch.

2. A wireless charging system, comprising a wireless charging and heating system, a transmitting part and a receiving part, wherein the wireless charging and heating system comprises:
- a lithium-ion battery stack;
- a battery stack power frequency converter connected with the lithium-ion battery stack and configured to convert direct current output from the lithium-ion battery stack into high-frequency alternating current;
- a heating system switch connected with the battery stack power frequency converter and configured to control on or off of the high-frequency alternating current;
- a heating coil connected with the heating system switch and configured to heat the lithium-ion battery stack; and
- a single chip microcomputer connected with the lithium-ion battery stack, the battery stack power frequency converter and the heating system switch, and configured to monitor a temperature of the lithium-ion battery stack and control an operating state of the battery stack power frequency converter and the heating system switch, wherein the transmitting part comprises:
- a power frequency power supply;
- a main circuit switch connected with the power frequency power supply;
- a frequency converter connected with the main circuit switch; and
- a transmitting coil connected with the frequency converter, and wherein the receiving part comprises:
- a receiving coil;
- a rectifier connected with the receiving coil;
- a voltage stabilizer connected with the rectifier; and
- a charging controller connected with the lithium-ion battery stack and configured to monitor a state-of-charge of the lithium-ion battery stack.

3. The wireless charging system according to claim 2, wherein the wireless charging system further comprises a mechanical auxiliary system, wherein the mechanical auxiliary system comprises:
- a lifting platform connected with the single chip microcomputer, and provided with the transmitting coil; and
- a sensing device connected with the single chip microcomputer and configured to detect a distance between the lifting platform and an automobile chassis and send a detection result to the single chip microcomputer.

4. The wireless charging system according to claim 2, wherein the transmitting coil is a plane disc with ten turns of wound copper wires.

5. The wireless charging system according to claim 3, wherein the sensing device is a distance sensor.

6. A wireless charging and heating method, wherein the method is applied to a wireless charging and heating system, comprising:
- a lithium-ion battery stack;
- a battery stack power frequency converter connected with the lithium-ion battery stack and configured to convert direct current output from the lithium-ion battery stack into high-frequency alternating current;
- a heating system switch connected with the battery stack power frequency converter and configured to control on or off of the high-frequency alternating current;
- a heating coil connected with the heating system switch and configured to heat the lithium-ion battery stack; and a single chip microcomputer connected with the lithium-ion battery stack, the battery stack power frequency converter and the heating system switch, and configured to monitor a temperature of the lithium-ion battery stack and control an operating state of the battery stack power frequency converter and the heating system switch, wherein the method comprises:

controlling the heating system switch to be closed;

controlling the battery stack power frequency converter to be closed; and enabling high-frequency alternating current to enter the heating coil through wires, and inducing eddy current around the lithium-ion battery stack to heat the lithium-ion battery stack.

7. A wireless charging method, wherein the method is applied to a wireless charging system comprising a wireless charging and heating system, a transmitting part and a receiving part, wherein the wireless charging and heating system comprises:

a lithium-ion battery stack;

a battery stack power frequency converter connected with the lithium-ion battery stack and configured to convert direct current output from the lithium-ion battery stack into high-frequency alternating current;

a heating system switch connected with the battery stack power frequency converter and configured to control on or off of the high-frequency alternating current;

a heating coil connected with the heating system switch and configured to heat the lithium-ion battery stack; and a single chip microcomputer connected with the lithium-ion battery stack, the battery stack power frequency converter and the heating system switch, and configured to monitor a temperature of the lithium-ion battery stack and control an operating state of the battery stack power frequency converter and the heating system switch, the transmitting part comprises:

a power frequency power supply;

a main circuit switch connected with the power frequency power supply;

a frequency converter connected with the main circuit switch; and a transmitting coil connected with the frequency converter, and the receiving part comprises:

a receiving coil;

a rectifier connected with the receiving coil;

a voltage stabilizer connected with the rectifier; and a charging controller connected with the lithium-ion battery stack and configured to monitor a state-of-charge of the lithium-ion battery stack;

wherein the method comprises:

controlling the main circuit switch to be closed;

controlling the frequency converter to rectify, filter and modulate the power frequency power supply to high-frequency alternating current, and generating a high-frequency magnetic field in the transmitting coil by the high-frequency alternating current;

inducing low-amplitude alternating current with a same frequency in the receiving coil by the high-frequency magnetic field generated in the transmitting coil;

converting the low-amplitude alternating current with the same frequency into direct-current voltage through the rectifier and enabling the direct-current voltage to enter the voltage stabilizer to obtain direct current, and charging the lithium-ion battery stack; and monitoring the state-of-charge of the lithium-ion battery stack in real time and controlling end of charging.

8. The wireless charging method according to claim 7, wherein before controlling the main circuit switch to be closed, the method further comprises:

controlling the lifting platform to rise;

monitoring the distance between the lifting platform and the automobile chassis;

after a predetermined distance is reached, controlling the lifting platform to stop; and after charging is finished, controlling the lifting platform to descend.

9. The wireless charging method according to claim 7, wherein the wireless charging system further comprises a mechanical auxiliary system, wherein the mechanical auxiliary system comprises:

a lifting platform connected with the single chip microcomputer, and provided with the transmitting coil; and a sensing device connected with the single chip microcomputer and configured to detect a distance between the lifting platform and an automobile chassis and send a detection result to the single chip microcomputer.

10. The wireless charging method according to claim 7, wherein the transmitting coil is a plane disc with ten turns of wound copper wires.

11. The wireless charging method according to claim 9, wherein the sensing device is a distance sensor.

* * * * *